United States Patent [19]

Hey

[11] Patent Number: 5,725,181
[45] Date of Patent: Mar. 10, 1998

[54] AIRCRAFT ENGINE THRUST MOUNT

[75] Inventor: Kenneth E. Hey, Seattle, Wash.

[73] Assignee: The Boeing Company, Seattle, Wash.

[21] Appl. No.: 640,698

[22] Filed: May 1, 1996

[51] Int. Cl.$^6$ ........................................ B64D 27/26
[52] U.S. Cl. ........................ 244/54; 60/39.31; 248/554
[58] Field of Search .................... 244/54; 60/39.31; 248/554, 555

[56] References Cited

U.S. PATENT DOCUMENTS

| | | |
|---|---|---|
| 3,844,115 | 10/1974 | Fried ........................ 244/54 X |
| 4,055,041 | 10/1977 | Adamson et al. . |
| 4,065,077 | 12/1977 | Brooks ........................ 244/54 |
| 4,603,821 | 8/1986 | White ........................ 244/54 |
| 4,603,822 | 8/1986 | Chee . |
| 4,717,094 | 1/1988 | Chee . |
| 4,742,975 | 5/1988 | Pachomoff et al. . |
| 4,997,145 | 3/1991 | Hodgkinson . |
| 5,078,342 | 1/1992 | Langley et al. . |
| 5,174,525 | 12/1992 | Schilling . |
| 5,238,206 | 8/1993 | Pachomoff . |
| 5,275,357 | 1/1994 | Seelen et al. . |
| 5,277,382 | 1/1994 | Seelen et al. . |
| 5,303,880 | 4/1994 | Cencula et al. . |
| 5,320,307 | 6/1994 | Spofford et al. . |
| 5,351,930 | 10/1994 | Gwinn et al. . |
| 5,474,258 | 12/1995 | Taylor et al. . |
| 5,620,154 | 4/1997 | Hey ........................... 244/54 |

OTHER PUBLICATIONS

Rolls Royce Trent 800 Aft Engine Mount.

*Primary Examiner*—William Grant
*Attorney, Agent, or Firm*—Christensen O'Connor Johnson & Kindness PLLC

[57] ABSTRACT

A fail-safe thrust mount (24) to attach a forward engine frame (16) to an aft engine mount (20) upper fitting (40). The thrust mount includes first and second thrust links (30), (32) attached to opposed first and second lateral ends (26), (28) of an evener bar (34), respectively. A center clevis (36) extends forwardly from the forward abutment surface (38) of the upper fitting (40). The center clevis (36) accepts a center portion (42) of the evener bar (34) and secures the evener bar therein using first and second connection mechanisms. The first connection mechanism is located forward of the second connection mechanism with respect to an airplane frame of reference. The first connection mechanism preferably includes a primary pin (44) inserted snugly through the center clevis (36) and through a primary pin hole (58) in the evener bar. The second connection mechanism preferably includes a reduced diameter catcher pin (46) inserted through the center clevis (36) and through a catcher pin hole (60) in the evener bar. The catcher pin connection includes a diametric gap (68) between the catcher pin (46) and the evener bar catcher pin hole (60). The evener bar (34) includes an aft edge (48) positioned near, though not normally contacting, the upper fitting forward surface (38).

23 Claims, 7 Drawing Sheets

AIRCRAFT ENGINE THRUST MOUNT

FIELD OF THE INVENTION

The present invention relates to apparatus for supporting aircraft engines, and more particularly, to fail-safe thrust mount apparatus for transferring axial jet engine loads to an aircraft support structure, such as a pylon or strut.

BACKGROUND OF THE INVENTION

Forward and aft engine mounts are currently used to mount an engine to an aircraft support structure, such as a wing or tail pylon. These mounts work well at carrying in-plane loads, i.e., those occurring generally in a plane extending perpendicularly outwardly from the longitudinal axis of the engine, including vertical and lateral loads and rotary torque or moments.

A thrust mount is provided for transferring axially-directed thrust loads of the engine to the support structure. Tension loads occur during forward thrust of the engine, and compression loads occur during braking from use of the engine's thrust reversers. For the aft-directed thrust in particular, the loads are commonly transferred from the engine through two thrust links to a portion of the thrust mount that is attached, typically, to the aft engine mount. The thrust load is then transferred to the wing pylon through shear pins in the aft engine mount. This route from the engine to the wing is generally referred to as the thrust load path.

It is important that thrust mounts be designed in such a way as to preclude the loss of an engine should there be a failure of any one component along the entire thrust load path. It is also important that the mount be relatively easy to manufacture, install, and maintain. At times, these aspects produce incompatible design goals that are difficult to effectively reconcile.

For example, one current thrust mount described in U.S. Pat. No. 5,320,307, uses a primary pin and two catcher pins to hold an evener beam in a thrust mount clevis. Both catcher pins are designed to engage if the primary pin fails or if a thrust link fails. The '307 design requires a wide thrust clevis in order to accept three pins in a row. Such a clevis is costly to machine since an end mill must reach a long distance into a hard material, e.g., titanium, in order to machine the open areas required to form the thrust clevis. This configuration also has the disadvantage of being inherently heavier because the required in-line bores limit the amount of weight-reducing pocketing that may be accomplished in the evener beam. The second catcher pin and the wideness of the overall clevis also add weight to this particular design.

There exists a need for a superior fail-safe thrust mount capable of handling thrust loads, while at the same time having a reasonable size and weight. The mount should provide adequate load bearing capability in the event of a thrust link or pin failure and should be easy to install. The mount should also be easy to maintain and require less custom manufacturing than current designs. As will be appreciated by the following description, the present invention provides such a superior fail-safe thrust mount.

SUMMARY OF THE INVENTION

In accordance with the present invention, a fail-safe thrust mount is provided for carrying axial engine loads and moments to various locations on a support structure such as a wing pylon. The thrust mount is attached between an engine frame and a support structure attachment fitting. Thrust mounts formed in accordance with the invention can be used in various locations on an airplane (e.g., to a wing pylon, to a tail strut, etc.) as well as at various engine locations (e.g., at the forward portion of the engine or at the aft portion of the engine).

In accordance with aspects of this invention, the thrust mount is preferably attached between a forward fan frame and an aft engine mount upper fitting. The thrust mount includes first and second thrust links attached to opposed first and second ends of a transverse evener bar. A center clevis extends forwardly from the aft engine mount upper fitting. The center clevis accepts a center portion of the evener bar and secures the evener bar therein using first and second connection mechanisms. The first connection mechanism is located forward of the second connection mechanism with respect to an airplane frame of reference.

In accordance with other aspects of this invention, the first and second thrust links each include a first end secured to the forward frame. The first thrust link includes a second end rotatably attached to the evener bar first end via a pin-and-clevis arrangement. The second thrust link includes a second end rotatably attached to the evener bar second end via a pin-and-clevis arrangement. The evener bar center portion is located generally midway between the evener bar first and second ends.

In accordance with still other aspects of this invention, the first connection mechanism is preferably a primary pin connection having a primary pin snugly inserted through the center clevis and through a primary pin hole in the evener bar. The second connection mechanism is preferably a reduced-diameter catcher pin connection with a catcher pin inserted through the center clevis and through a catcher pin hole in the evener bar. The catcher pin connection includes a diametric gap between the catcher pin and the evener bar catcher pin hole. The evener bar includes an aft edge portion positioned near and facing, though not normally contacting, a forwardly facing abutment surface of the upper fitting.

In accordance with additional aspects of this invention, the second connection mechanism is preferably safe-life structure and hence not requiring fail-safe redundancy.

In accordance with yet other aspects of this invention, during normal operations, thrust loads are passed from the thrust links to the evener bar and through the primary pin connection to the upper fitting. The evener bar aft edge does not contact the upper fitting forward abutment surface, nor does the catcher pin contact the surfaces of the evener bar catcher pin hole.

In accordance with further aspects of this invention, during failure of one of the thrust links or link end connections, the evener bar rotates slightly about the primary pin connection so that the aft edge comes into contact with the upper fitting forward abutment surface. The catcher pin does not contact the evener bar catcher pin hole. Thrust loads thus pass directly from the evener bar to the upper fitting via both the primary pin connection and the evener bar contact point with the upper fitting forward abutment surface.

In accordance with still further aspects of this invention, during failure of the first connection, the evener bar does not contact the upper fitting; however, the diametric gap of the catcher pin is askew, so that the catcher pin contacts the evener bar catcher pin hole. Thrust loads thus pass directly from the evener bar to the upper fitting via the catcher pin connection.

In accordance with yet further aspects of this invention, the evener bar includes reinforced portions for adding structural strength to select parts of the evener bar and machined pockets for reducing mount weight from select parts of the mount.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Figure 1:
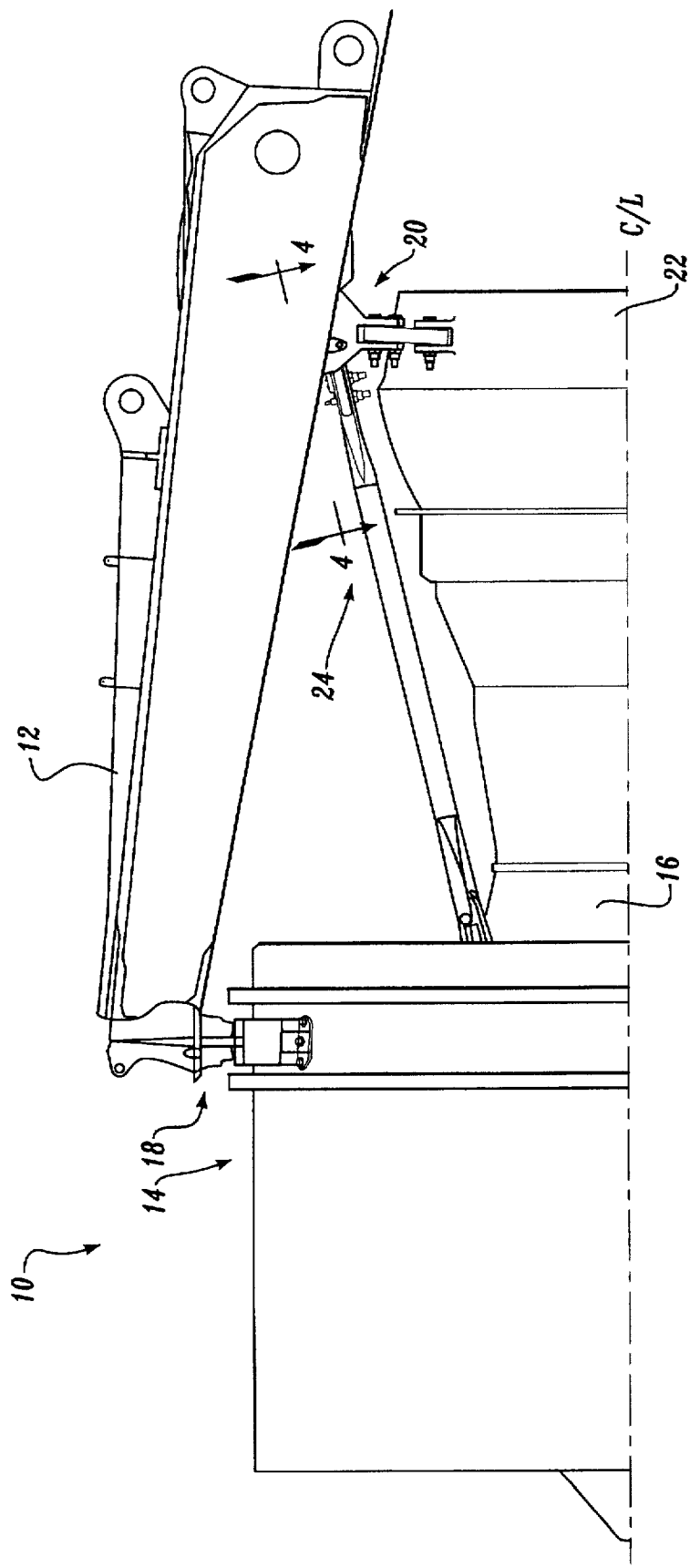
FIG. 1 is a partial side view of a jet engine with a thrust mount, formed in accordance with the present invention, attached to the engine.
Figure 2:
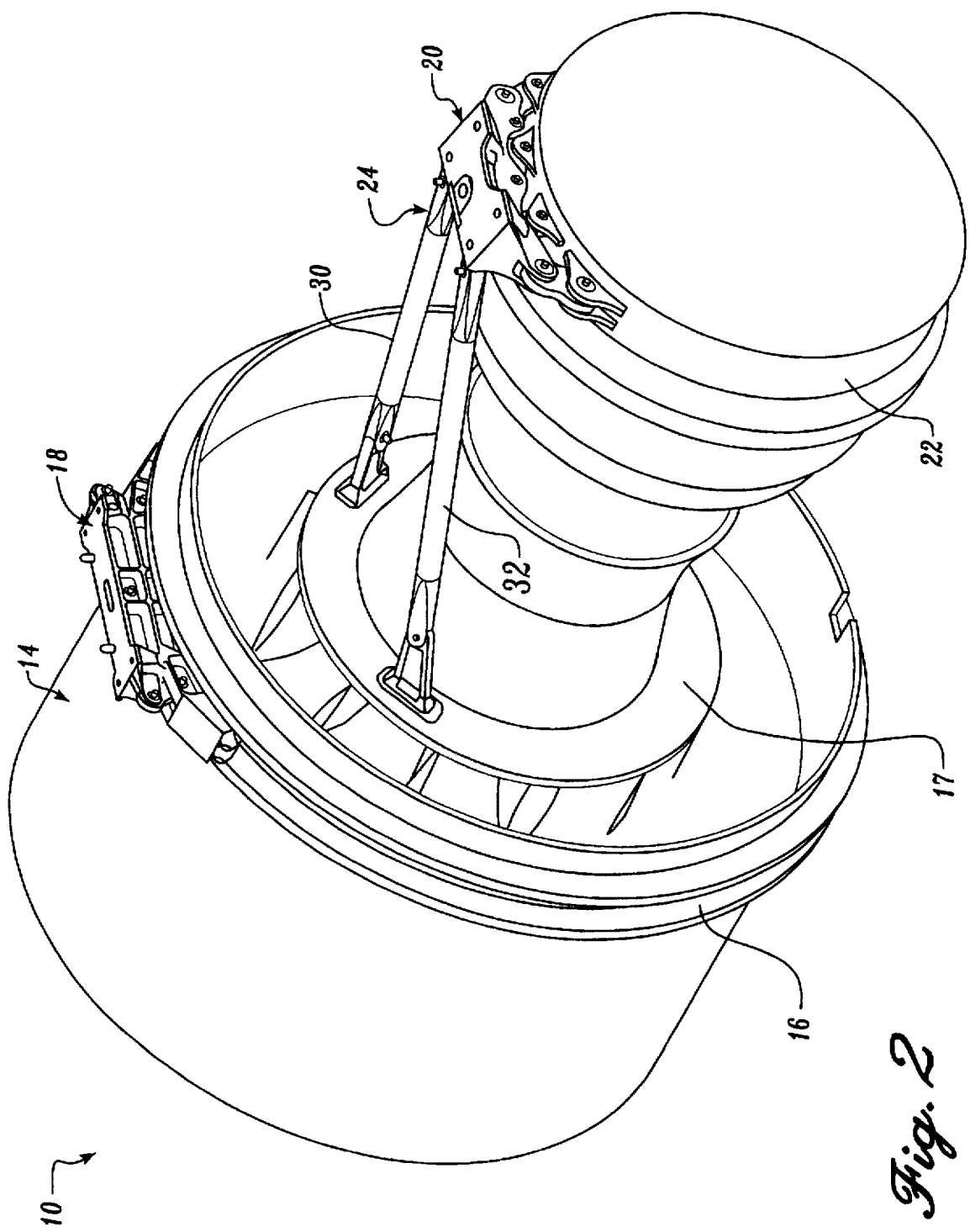
FIG. 2 is a rear perspective view of the engine and present invention thrust mount of FIG. 1.

Illustrated schematically in FIGS. 1 and 2 is a turbine jet engine 10 mounted to a support structure, such as a conventional wing pylon or strut 12. The engine 10 includes a fan 14 which is supported by a forward frame 16 fixedly joined to the engine 10 via an inner annulus 17, as shown in FIG. 2. A forward engine mount 18 attaches a portion of the forward frame 16 to a forward location of the pylon 12. An aft engine mount 20 supports a rear frame 22 fixedly joined to an aft portion of the engine 10. The forward frame 16 and the rear frame 22 are disposed generally coaxially about the centerline axis of the engine 10.

A thrust mount 24 formed according to the present invention is provided for carrying axial engine forces and moments to the pylon 12. In the preferred embodiment, the thrust mount 24 is attached to the forward frame inner annulus 17 and the aft engine mount 20. The thrust mount, however, may be separate from the aft engine mount 20 provided a suitable connection from the thrust mount 24 to the pylon 12 is provided. In a like manner, the thrust mount 24 may alternatively be attached between the rear frame and the forward engine mount or other suitable forward structural support attachment fitting.

Figure 3:
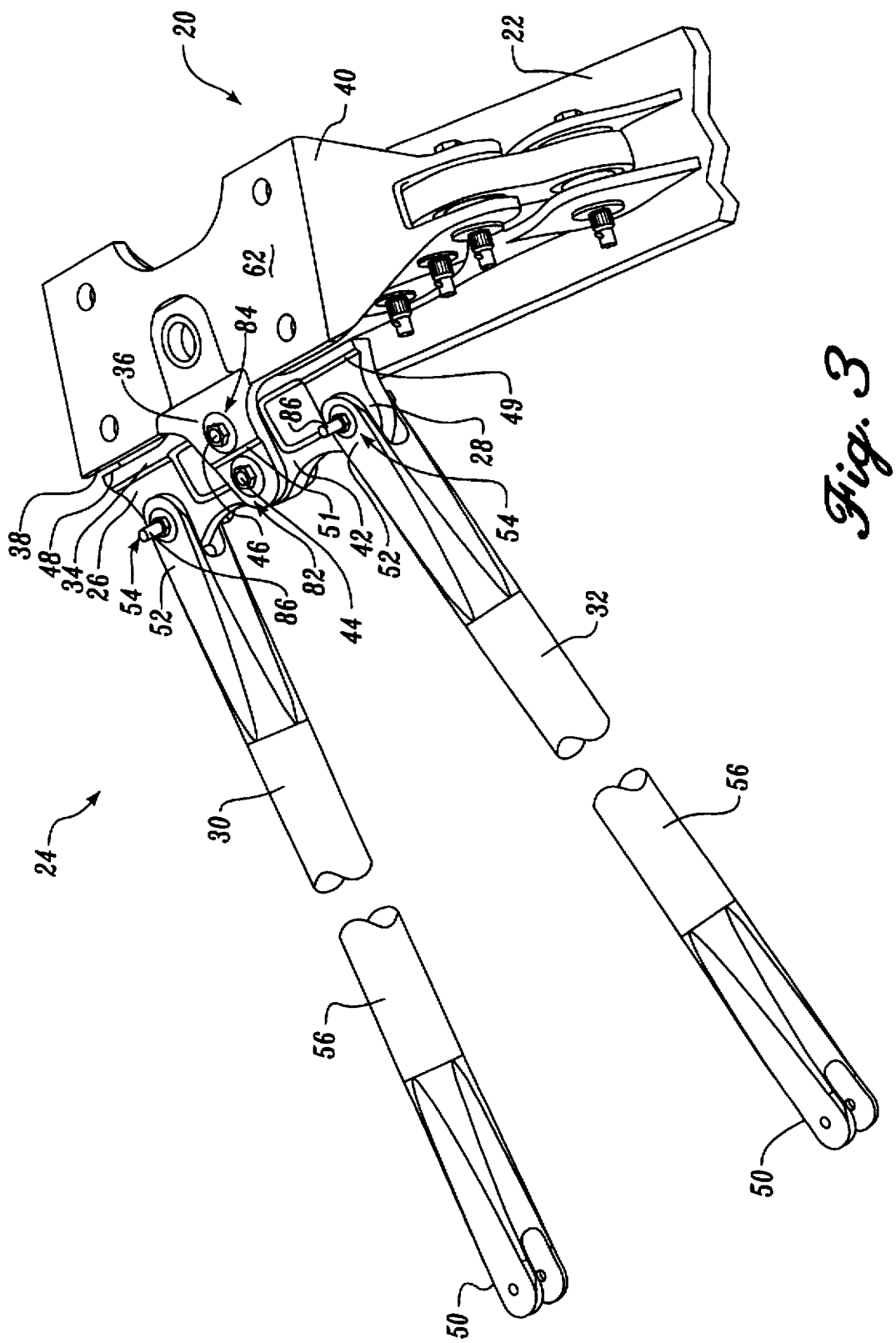
FIG. 3 is a perspective view of a thrust mount formed in accordance with the present invention.

Shown in FIG. 3 is a perspective view of the thrust mount 24. In general, the mount 24 includes conventional first and second thrust links 30, 32 rotatably attached to opposed first and second ends 26, 28, respectively, of a transversely extending evener bar 34. A center clevis 36 extends laterally from a forward abutment surface 38 of an aft engine mount upper fitting 40. The center clevis 36 accepts a center portion 42 of the evener bar 34 and secures the evener bar therein using first and second connection mechanisms 82, 84. The first connection mechanism 82 is located generally forward of the second connection mechanism 84 relative to an airplane frame of reference.

In general, during normal operations, thrust loads are passed from the thrust links to the evener bar and through the first connection mechanism to the upper fitting. The evener bar aft edge 48 normally does not contact the upper fitting forward abutment surface 38, nor does the second connection mechanism normally carry any loads. During failure of a thrust link or one of its end connections, the evener bar 34 rotates slightly about the first connection mechanism 82 so that the aft edge 48 comes into contact with the upper fitting forward surface 38. Thrust loads therefore pass directly from the evener bar 34 to the upper fitting 40 via the first connection mechanism 82 and the evener bar contact point with the upper fitting. During failure of the first connection mechanism 82, the evener bar 34 does not contact the upper fitting 40; however, the second connection mechanism 84 is arranged to transfer the thrust loads. All thrust loads thus pass from the evener bar 34 to the upper fitting 40 via the second connection mechanism 84.

In more detail, shown in FIG. 3 each thrust link 30, 32 includes a forward, or distal, end 50 pivotally joined to the inner annulus 17. The attachments of the thrust link distal ends 50 may be accomplished using any one of a number of known methods. Shown in FIG. 2 is a pin and clevis arrangement. Each thrust link 30, 32 further includes an aft, or proximal, end 52 for rotatable connection to the lateral ends 26, 28 of the evener bar 34. The axis of rotation between the thrust links and the evener bar is oriented generally transverse to the longitudinal axis of the thrust links. The preferred connections of thrust link proximal ends 52 to evener bar 34 are pin-and-clevis joints 54 whereby each proximal end 52 is in the form of a clevis with upper and lower tines to receive the evener bar 34 between the tines. The evener bar first end 26 is attached to the proximal end 52 of the first thrust link 30 via a shear pin 86 inserted therethrough both. The evener bar second or opposite end 28 is attached to the second thrust link 32 proximal end 52 in a like manner. A substantially straight rod or tube portion 56 extends between each thrust link's proximal and distal ends. The desired tube thickness, diameter, and material composition may be determined using current design practices and considerations well known to those skilled in the art.

The preferred first connection mechanism 82 is a primary pin connection and the preferred second connection mechanism 84 is a catcher pin connection. The evener bar center portion 42 includes a primary pin hole 58 and a catcher pin hole 60 (shown in FIG. 5). These holes are circular and are formed about an axis generally normal to the plane of the evener bar 34. The primary pin hole 58 is sized according to the requirements of a particular application and factors known to those skilled in the art. The catcher pin hole 60 is sized as discussed below. The primary pin hole 58 is located directly forward of the catcher pin hole 60 relative to an airplane frame of reference. As shown in the plan view of FIG. 4, the primary pin connection and catcher pin connection are therefore roughly equal distance to the evener bar first and second ends 26, 28.

Figure 4:
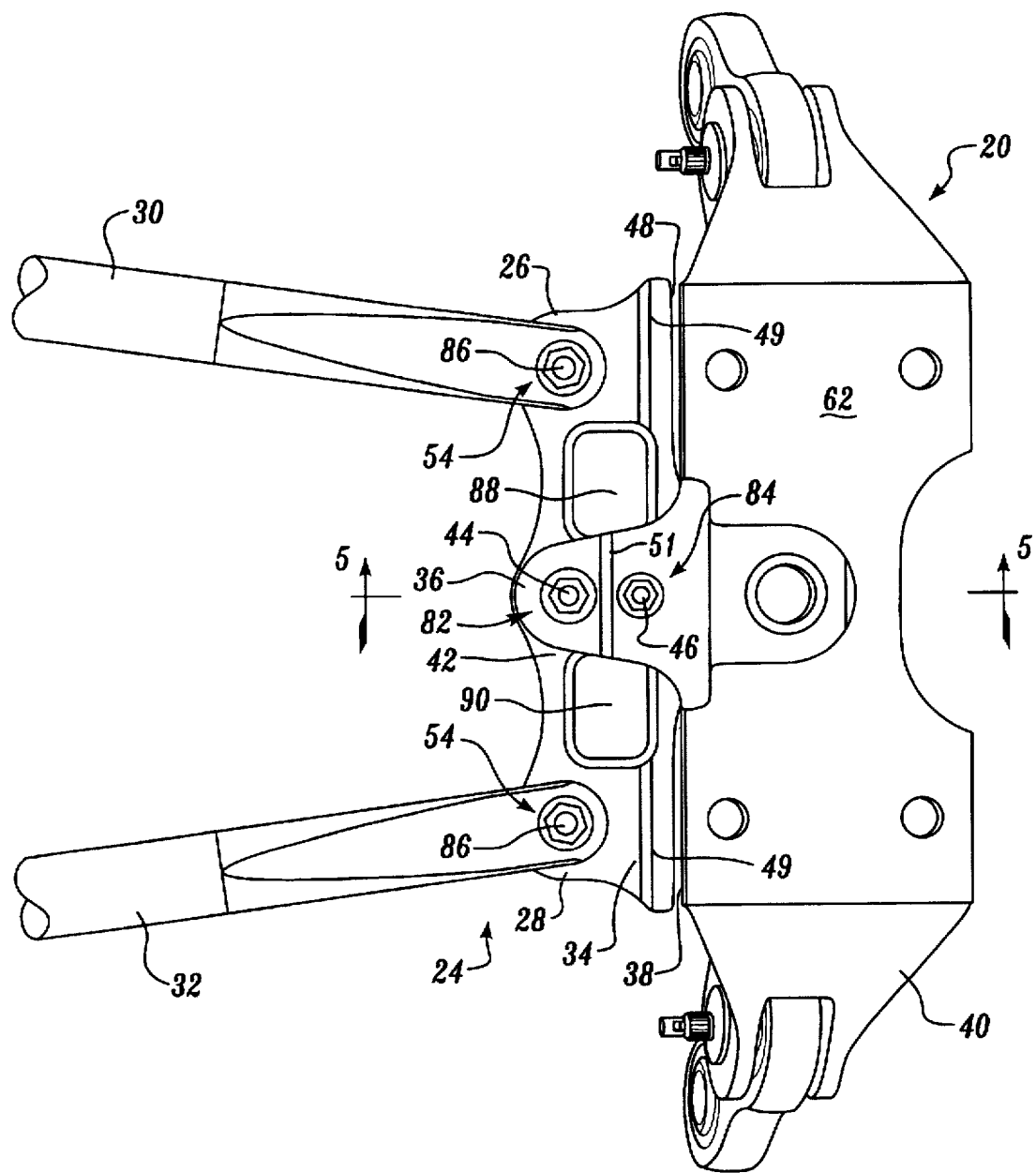
FIG. 4 is a top down view of the thrust mount of FIG. 3.
Figure 5:
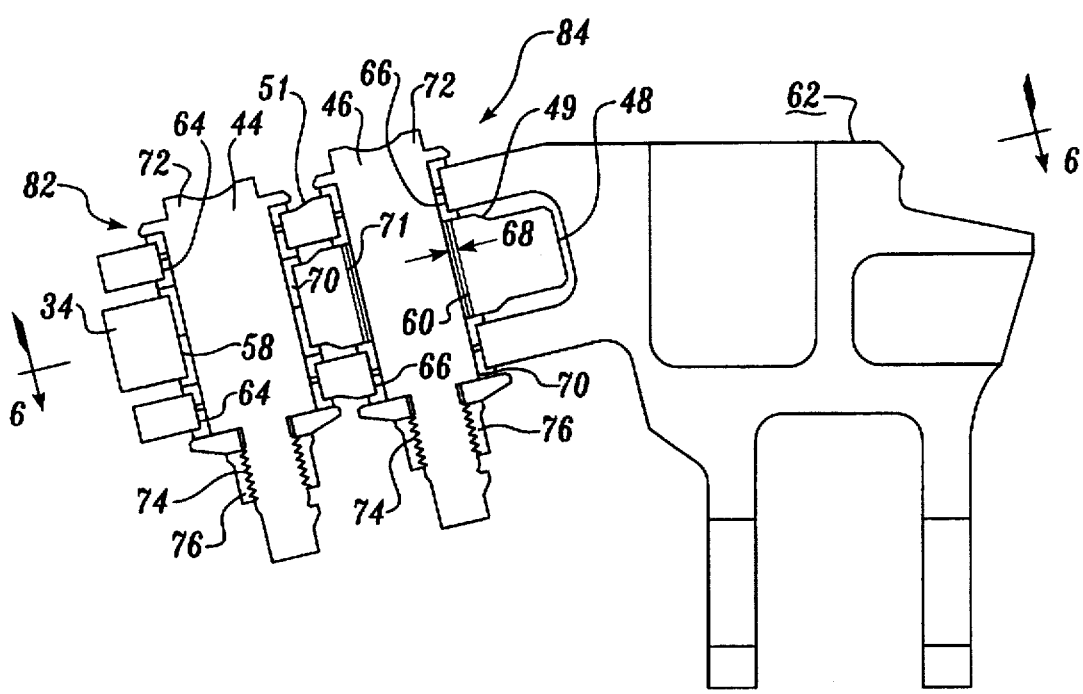
FIG. 5 is a side view of the thrust mount of FIG. 3.

Referring to FIGS. 3 and 4, the upper fitting 40 includes a mounting platform 62 for attaching the aft engine mount 20 to the wing pylon 12 by conventional methods, such as using mounting bolts (not shown) extending through a number of holes in the platform surface. As shown in FIG. 5, the center clevis 36 extends from the upper fitting 40 at a slight, downward angle. This angle is due to the location of the thrust link distal end connections with the forward annulus 17. In general, the exact orientation of the center clevis 36 will be a function of the thrust link forward connections. It is preferable that the connections of the thrust links 30, 32 to the evener bar 34, and the evener bar 34 to the center clevis 36, be substantially co-planar (such as is shown in FIGS. 3 and 5).

Still referring to FIG. 5, the center clevis 36 includes a forward hole 64 and an aft hole 66. Both holes 64, 66 extend through both tines of the center clevis 36 in a manner generally transverse to the plane of the evener bar and clevis tines. When the evener bar center portion 42 is inserted between the tines of the center clevis 36, the forward clevis hole 64 aligns with the primary pin hole 58 and the aft clevis hole 66 aligns with the catcher hole 60. A primary pin 44 is inserted through the center clevis forward hole 64 and through the primary pin hole 58 in the evener bar. A catcher pin 46 is inserted through the center clevis aft hole 66 and through the catcher pin hole 60 in the evener bar. The evener bar 34 is held in the clevis by the primary pin 44 during normal airplane operations.

The above described primary and catcher pin connections are the preferred embodiment of the first and second connection mechanisms. The present invention, however, encompasses the use of other connection mechanisms provided they allow the use of at least two connection locations, one positioned generally aft of the other.

The preferred embodiment of the present invention further includes the use of a diametric gap 68 between the catcher pin 46 and the evener bar catcher pin hole 60. The diametric gap 68 ensures that the evener bar 34 will not contact or transfer loads to the catcher pin during most flight conditions. The preferred gap is roughly 0.050 inches between the catcher pin hole 60 and the catcher pin 46. A preferred range of gap sizes is between about 0.010 to 0.100 inches. Obviously, these dimensions are to be taken as exemplary, since other dimensions may be more suitable for a particular application or embodiment of the present invention.

Still referring to FIG. 5, multiple bushings 70 are located at the primary and catcher pin connections. The bushings 70 help to reduce vibration and frictional wear of the evener bar and of the primary and catcher pins. Thinner bushings 71 are used between the catcher pin 46 and the evener bar catcher hole 60 to preserve the diametric gap 68 therebetween. Except for the diametric gap, the clevis tines, the bushings 70, the evener bar 34 and the pins 44, 46 are all sized to fit closely together. The primary and catcher pins 44, 46 each includes a head 72 located at one end and a threaded shank portion 74 located at the other end. When inserted in the clevis tines, the length of each pin is sufficient to allow the threaded portion 74 to extend past the tines. A nut 76 engages with the threaded portion 74 of each pin to firmly secure the pin in the clevis.

Figure 6:
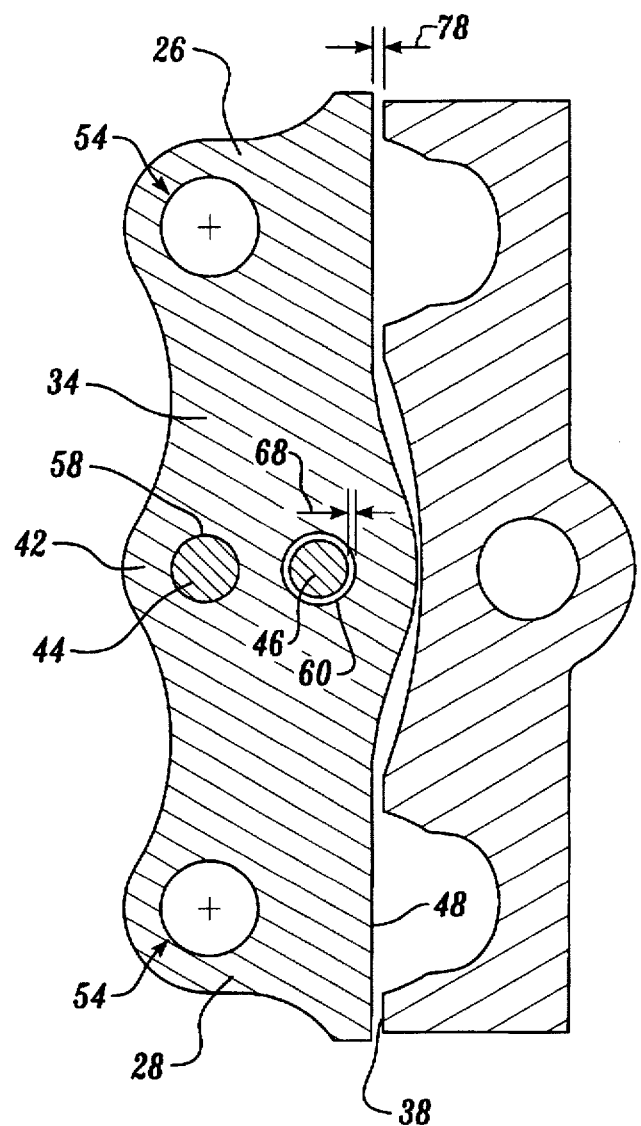
FIG. 6 is a top down schematic of an evener bar formed in accordance with the present invention.

The evener bar aft edge 48 is shaped such that a slight distance 78 is formed between the aft edge 48 and the upper fitting forward surface 38 (as shown in FIG. 6). A distance from the aft edge to the forward surface of about 0.1420 inches has been found to work well for one aircraft application. It is preferable to use the smallest distance possible considering various factors, e.g., manufacturing tolerances, load deflections, thermal deflections, etc., present in a particular application. A distance of about 0.1 to 0.2 inches during normal operation has found to be satisfactory. The evener bar ends 26, 28 normally maintain their distance from the forward surface 38 since generally equal amounts of thrust load are transmitted through each of the thrust links 30, 32 to the evener bar 34. It is preferred that the aft edge 48 near the evener bar center potion 42 not contact the upper fitting during any mode of operation.

Under current U.S. and various foreign regulatory rules, damage tolerance can be achieved by having a "fail-safe backup" or by using "safe-life structure". "Fail-safe backup" under the U.S. regulatory rules refers to structure that has been evaluated to assure that catastrophic failure is not probable after fatigue failure or obvious partial failure of a single, principal structural element. "Safe-life structures" are those that have been evaluated to be able to withstand the repeated loads of variable magnitude expected during the structure's service life without detectable cracks. See U.S. Department of Transportation, Federal Aviation Administration Advisory Circular No.: 25.571-1B. Therefore, safe-life structures experience operational stresses that are low enough relative to the capability of the part that no detectable cracks will develop during the expected life of the part. Safe-life structures do not require a failsafe backup. With regard to the present invention, the thrust mount second connection mechanism is preferably formed as safe-life structure.

Referring to FIGS. 4 and 5, the evener bar aft edge region is thicker than the forward region of the evener bar. This thickness is indicated in FIGS. 4 and 5 as reference number 49. The thickness is continued at the second connection mechanism, e.g., around the catcher pin hole, so that the entire second connection mechanism is safe-life structure. Likewise, in FIG. 5 the clevis at the second connection mechanism location is preferably increased in thickness as indicated by reference number 51. The precise increase in thickness of portions 49 and 51 will depend upon the design stresses of a particular application as well as other factors known to those skilled in the art. The remaining regions of the evener bar and clevis need not be safe-life structure, since the fail-safe attributes of the present invention provide adequate redundancy. These fail-safe attributes are discussed below in detail.

The evener bar 34 may include structurally reinforced portions to selectively provide extra load-carrying capability and bored-out portions (such as indentations 88 and 90 shown in FIG. 4) to lessen the overall weight of the thrust mount. The precise location and size of these portions will depend on the particular application.

Referring to FIG. 6, during normal operations, thrust loads are transferred from the fan annulus 17 to the thrusts links 30, 32, then to the ends 26, 28 of the evener bar 34, and finally to the upper fitting 40 via the primary pin connection at the center clevis 36. Thrust loads may be directed either forwardly, as during propulsion operation of the engine, which places the thrust links 30, 32 in tension; or the thrust loads may be directed aftward, as upon deployment of the conventional thrust reversers of the engine, which places the thrust links 30, 32 in compression.

During normal operations, the substantial equality of loads stemming from the thrust links 30, 32 to the evener bar 34 ensures the open gap 78 between the evener bar aft edge 48 and the upper fitting forward surface 38. Likewise, the diametric gap 68 of the catcher pin connection ensures that the catcher pin 46 remains unloaded during normal operations. This arrangement allows the load path to pass to the upper fitting entirely through the primary pin connection.

Figure 7:
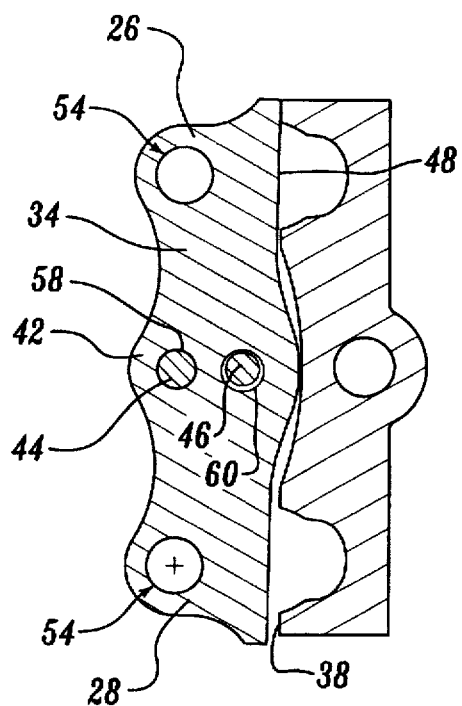
FIG. 7 is a top down schematic of the evener bar of FIG. 6, as positioned during a failure of a thrust link or link connection.

Referring to FIG. 7, during a failure of any component along the load path between the forward flame and the evener bar (e.g., a thrust link), the evener bar 34 will rotate slightly about the primary pin connection so that a portion of the evener bar aft edge 48 will contact the forward surface of the upper fitting 40. In FIG. 7, the first thrust link 30 has failed causing the evener bar 34 to contact the fitting near the evener bar first end 26. Thrust loads are thereby transmitted to the upper fitting 40 via both the primary pin connection and the contact point. The fail-safe catcher pin hole in the evener bar 34 is preferably sized large enough to prevent the catcher pin 46 from engaging for this type of failure. Therefore, the catcher pin connection remains unloaded. In FIG. 7, the inner circle represents the diameter of the catcher pin 46 and the outer circle represents the diameter of the evener bar catcher pin hole 60. As shown, the catcher pin 46 is slightly closer to the catcher pin hole, but is not actually contacting the catcher pin hole 60.

Figure 8:
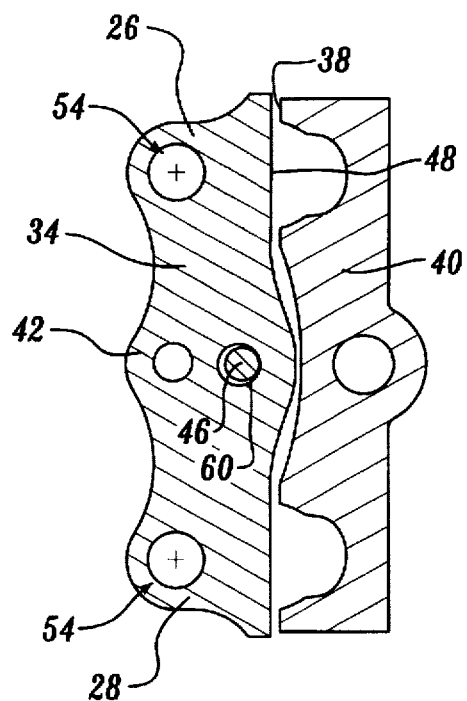
FIG. 8 is a top down schematic of the evener bar of FIG. 6, as positioned during a failure of a primary pin.

Referring to FIG. 8, during a failure of the first connection mechanism such as the primary pin 44, the second connection mechanism will engage and will assume the thrust loads. Therefore, the catcher pin 46 is shown in FIG. 8 contacting the evener bar catcher pin hole 60. The aft edge 48 of the evener bar does not contact the upper fitting 40 since loads through the thrust links 30, 32 remain balanced. In general, failure of the second connection mechanism is not of concern, since the second connection mechanism normally does not carry any loads and since during its use is preferably considered safe-life structure. Of course, an alternative embodiment of a second connection mechanism may be formed that is not considered safe-life structure should a designer desire to omit that safety feature or desire to provide an alternative backup arrangement.

As will be appreciated by those skilled in the art, the fail-safe thrust mount of the present invention keeps the engine attached to the airplane even during a failure at any single point along the thrust mount load path, including failure at one of the thrust links, one of the link-to-mount connections, the evener bar, or the thrust mount clevis. This new design has several advantages over previous fail-safe thrust mount concepts. Specifically, because the present invention uses only one catcher pin, the overall width of the thrust mount is more compact. The fail-safe design is lighter in weight and utilizes a generous load couple to minimize stress in failure modes. The aft engine mount upper fitting has no unloaded catcher devises to wear unnecessarily. The thrust clevis can be extended forward efficiently to gain more space between the clevis and the strut, if necessary. The narrow thrust clevis on the aft mount minimizes the amount of difficult machining of metal required for producing the mount. This is both a savings in cost as well as in weight.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A thrust mount for supporting a jet engine having a flame and an engine support structure attachment fitting, the thrust mount comprising:

(a) a central clevis extending from a forward surface of the attachment fitting and defining a longitudinal direction, the central clevis including first and second connection locations, the first connection location being positioned forwardly of the second connection location and generally aligned in said longitudinal direction;

(b) an evener bar extending in a lateral direction generally transverse to said longitudinal direction and having first and second connection locations generally aligned in said longitudinal direction and corresponding to the first and second connection locations of the central clevis, the evener bar including an aft edge portion facing the forward surface of the attachment fitting;

(c) first and second thrust links each having a first end connected to the engine frame and a second end connected to the evener bar;

(d) first connection mechanism for connecting the first connection location of the central clevis to the first connection location of the evener bar; and (e) second connection mechanism for connecting the second connection location of the central clevis to the second connection location of the evener bar;

(f) wherein one of the first and second connection mechanisms transfers thrust loads between the engine frame and the engine support structure attachment fitting during normal operations.

2. A thrust mount formed according to claim 1, wherein the central clevis includes first and second tines, the first connection mechanism includes a primary pin, the second connection mechanism includes a catcher pin, and the evener bar includes a primary pin hole and a catcher pin hole, the evener bar being disposed between the clevis first and second tines and held therein by at least the primary pin.

3. A thrust mount according to claim 2, wherein the second connection mechanism includes a diametric gap between the catcher pin and the evener bar catcher pin hole.

4. A thrust mount according to claim 3, wherein the diametric gap is between about 0.010 to 0.100 inches.

5. A thrust mount according to claim 1, wherein the second connection mechanism is arranged to be unloaded during normal operations.

6. A thrust mount according to claim 1, wherein the aft edge portion of the evener bar is spaced from the forward surface of the attachment fitting during normal operations.

7. A thrust mount according to claim 6, wherein the aft edge portion of the evener bar to the upper fitting is between about 0.1 to 0.2 inches during normal operations.

8. A thrust mount according to claim 1, wherein the aft edge portion of the evener bar is arranged such that it contacts the upper fitting during failure of one of the first and second thrust links or link connections.

9. A thrust mount according to claim 1, wherein the second connection mechanism is sized such that it remains unloaded during a failure of one of the first and second thrust links or link connections.

10. A thrust mount according to claim 1, wherein the second connection mechanism is arranged such that it carries thrust loads during a failure of the first connection mechanism.

11. A thrust mount according to claim 1, wherein the evener bar aft edge portion is arranged such that it does not contact the fitting during a failure of the first connection mechanism.

12. A thrust mount according to claim 1, wherein the evener bar includes first and second lateral ends disposed on opposite sides of the central clevis, wherein the first thrust link second end is rotatably connected to the evener bar first end, and wherein the second thrust link second end is rotatably connected to the evener bar second end.

13. A thrust mount according to claim 12, wherein the connections of the thrust link second ends include pin-and-clevis joints.

14. A thrust mount according to claim 1, wherein the frame is a forward fan frame and the engine support structure attachment fitting is an upper fitting of an aft engine mount.

15. A thrust mount according to claim 1, wherein the second connection mechanism is a safe-life structure, the second connection mechanism cross-sectional area being greater than the first connection mechanism cross-sectional area.

16. A thrust mount for supporting a jet engine having a forward fan frame and an aft engine mount with an upper fitting, the thrust mount comprising:

(a) a central clevis extending from a forward surface of the upper fitting and defining a longitudinal direction, the central clevis including first and second tines and a primary pin connection location and a catcher pin connection location, the primary pin connection location being located forward of the catcher pin connection location generally aligned with said longitudinal direction;

(b) a transversely extending evener bar including an aft edge, a primary pin hole, and a catcher pin hole, with the primary pin hole and catcher pin hole being generally aligned in said longitudinal direction corresponding to said primary pin connection location and catcher pin connection location, and the evener bar being disposed between the clevis first and second tines and held therein by a primary pin at said primary pin connection location, the evener bar aft edge being a spaced-apart distance from the upper fitting forward surface;

(c) a catcher pin extending through the clevis first and second tines and the evener bar catcher pin hole at said catcher pin connection location; and (d) first and second thrust links each having a first end connected to the forward fan frame and a second end connected to the evener bar.

17. A thrust mount according to claim 1, wherein the catcher pin connection location is a safe-life structure and the regions of the evener bar at the catcher pin hole and at the aft edge are safe-life structures.

18. A thrust mount according to claim 16, wherein a diametric gap exists between the catcher pin and the evener bar catcher pin hole.

19. A thrust mount according to claim 18, wherein the diametric gap is between about 0.010 to 0.100 inches.

20. A thrust mount according to claim 16, wherein during normal operations the catcher pin is unloaded, the aft edge portion of the evener bar is spaced from the forward surface of the attachment fitting, and the primary pin carries the thrust loads.

21. A thrust mount according to claim 20, wherein the distance between the aft edge of the evener bar to the upper fitting is between about 0.1 to 0.2 inches.

22. A thrust mount according to claim 16, wherein the aft edge of the evener bar and the catcher pin hole are sized such that during failure of one of the first and second thrust links, the aft edge of the evener bar contacts the upper fitting, the catcher pin carries no thrust loads, and the primary pin carries the thrust loads.

23. A thrust mount according to claim 16, wherein the connection of the first and second thrust links to the evener bar and the catcher pin connection location are arranged such that during failure of the primary pin or primary pin hole, the catcher pin carries thrust loads and the evener bar aft edge does not contact the fitting.

* * * * *

UNITED STATES PATENT AND TRADEMARK OFFICE
CERTIFICATE OF CORRECTION

PATENT NO. : 5,725,181
DATED : March 10, 1998
INVENTOR(S) : K.E. Hey

It is certified that error appears in the above-identified patent and that said Letters Patent is hereby corrected as shown below:

COLUMN     LINE

7     49     "flame" should read --frame--
(Claim 1, line 2)

8     34     After "thrust links" delete "or link connections"
(Claim 8, line 4)

10     25     Before "the primary pin" insert --one of--
(Claim 23, line 4)

Signed and Sealed this

Twenty-sixth Day of May, 1998

Attest:

BRUCE LEHMAN

Attesting Officer     *Commissioner of Patents and Trademarks*